(12) United States Patent
Berheide et al.

(10) Patent No.: US 8,851,490 B2
(45) Date of Patent: Oct. 7, 2014

(54) STABILIZER ARRANGEMENT

(71) Applicant: Benteler Automobiltechnik GmbH, Paderborn (DE)

(72) Inventors: Friso Berheide, Rheda-Wiedenbrueck (DE); Andreas Janzen, Willebadessen (DE)

(73) Assignee: Benteler Automobiltechnik GmbH (DE)

( * ) Notice: Subject to any disclaimer, the term of this patent is extended or adjusted under 35 U.S.C. 154(b) by 0 days.

(21) Appl. No.: 13/654,588

(22) Filed: Oct. 18, 2012

(65) Prior Publication Data

US 2013/0093152 A1 Apr. 18, 2013

(30) Foreign Application Priority Data

Oct. 18, 2011 (DE) .................. 10 2011 116 092

(51) Int. Cl.
*B60G 21/055* (2006.01)
*B60G 11/18* (2006.01)
*B60G 11/20* (2006.01)
*B60G 21/04* (2006.01)

(52) U.S. Cl.
CPC .......... *B60G 21/04* (2013.01); *B60G 2204/122* (2013.01); *B60G 2204/4307* (2013.01); *B60G 11/183* (2013.01); *B60G 2206/427* (2013.01); *B60G 11/20* (2013.01); *B60G 21/0553* (2013.01); *B60G 2206/82* (2013.01); *B60G 2202/135* (2013.01)
USPC ............................. 280/124.107; 280/124.152

(58) Field of Classification Search
CPC ............... B60G 21/04; B60G 21/0555; B60G 21/0556; B60G 11/183; B60G 11/185; B60G 11/20; B60G 21/0553; B60G 2206/427
USPC ..................... 280/124.106, 124.152, 124.107
See application file for complete search history.

(56) References Cited

U.S. PATENT DOCUMENTS 2,757,938 A * 8/1956 Crowder ................. 280/124.103
3,197,233 A * 7/1965 Bauer et al. ................. 280/5.502
3,198,539 A * 8/1965 McMullen et al. ........ 280/43.17

(Continued)

FOREIGN PATENT DOCUMENTS

AU 617467 11/1991
DE 1179124 10/1964

(Continued)

OTHER PUBLICATIONS

European Search Report for European Patent Application No. 12401207 dated Dec. 12, 2012, 2 pages.

*Primary Examiner* — Paul N Dickson
*Assistant Examiner* — Timothy Wilhelm
(74) *Attorney, Agent, or Firm* — Sheridan Ross P.C.

(57) ABSTRACT

The invention relates to a stabilizer arrangement for a motor vehicle, composed of a first stabilizer half, a second stabilizer half, and an actuator which couples the two stabilizer halves, wherein a first connecting section of the actuator is connected to the first stabilizer half, and a second connecting section of the actuator is connected to the second stabilizer half, in a rotationally fixed fashion and so as to be nondisplaceable in the axial direction. In this context, at least one connecting element is present which connects the stabilizer halves by their end sides to the connecting sections, and wherein the at least one connecting element is embodied as a pin connection, bolt connection or screw connection.

15 Claims, 3 Drawing Sheets

(56) References Cited

U.S. PATENT DOCUMENTS

Figure 1:
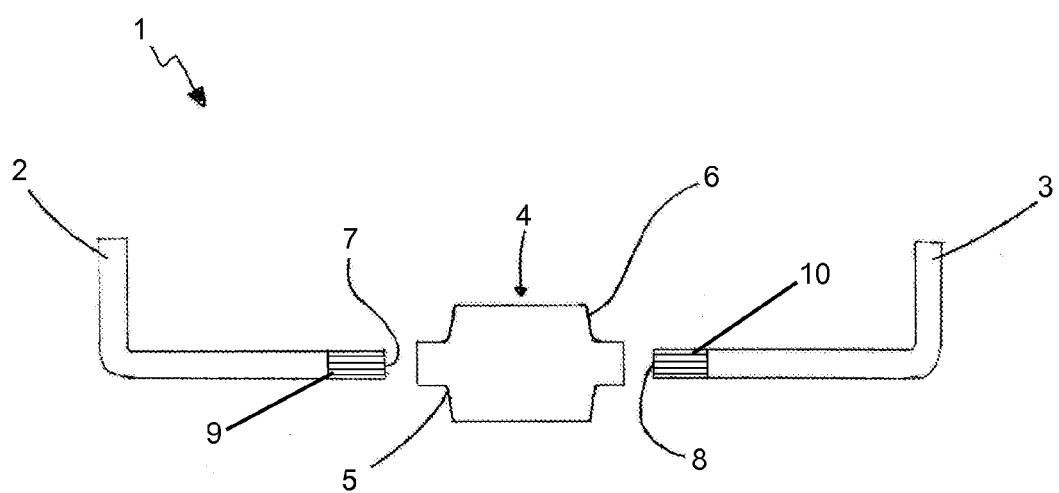

| | | |
|---|---|---|
| 3,836,272 A | 9/1974 | Duer |
| 5,527,061 A * | 6/1996 | Karl .................. 280/124.107 |
| 5,632,502 A * | 5/1997 | Oppitz et al. ......... 280/124.106 |
| 5,700,027 A * | 12/1997 | Schiffler ............... 280/124.162 |
| 6,257,603 B1 * | 7/2001 | Busch et al. .......... 280/124.106 |
| 6,435,531 B1 * | 8/2002 | Acker et al. .......... 280/124.107 |
| 6,513,819 B1 * | 2/2003 | Oliver et al. .......... 280/124.152 |
| 7,287,759 B2 * | 10/2007 | Uchiyama et al. ......... 280/5.511 |
| 7,494,132 B2 * | 2/2009 | Smay ...................... 280/5.508 |
| 7,837,202 B2 * | 11/2010 | Taneda et al. ............... 280/5.511 |
| 2011/0037239 A1 * | 2/2011 | Mori et al. ............. 280/124.106 |

FOREIGN PATENT DOCUMENTS

| | | |
|---|---|---|
| DE | 4337771 | 5/1995 |
| DE | 19936540 | 2/2001 |
| DE | 19936541 | 2/2001 |
| DE | 10206032 | 8/2003 |
| EP | 1437253 | 7/2004 |
| FR | 2623754 | 6/1989 |

* cited by examiner

STABILIZER ARRANGEMENT

CROSS REFERENCE TO RELATED APPLICATIONS

This application claims the benefit of German Application No. 10 2011 116 092.6 filed Oct. 18, 2011, the entire disclosure of which is incorporated herein by reference.

The invention relates to a stabilizer arrangement for a motor vehicle corresponding to the features of the preamble of claim 1.

Stabilizers are used in vehicle construction to improve the rolling behavior of motor vehicles. When the wheels experience alternating spring compression, the rolling is limited and the ability to control the vehicle is improved. Depending on the driving situation it may be necessary for a stabilizer rod to act either in a rotationally flexible or rotationally rigid fashion. In order to be able to implement both states with one component, active or semi-active stabilizer systems which can be switched between both states, in particular with any desired intermediate stages, are increasingly being made available. These systems are composed of two stabilizer halves and an actuator connecting them. The connections between these individual parts are subject to high loads and must be resistant to both axial and rotational movements.

DE-PS 11 05 290 discloses such a stabilizer arrangement in which the stabilizer halves are connected in a rotationally fixed fashion via a toothing. These stabilizer halves have here an external toothing, while the respective actuator connections have an internal toothing.

DE 1 179 124 A has such a toothing by means of which a rotary piston is connected to the stabilizer half therein in the form of a torsion rod component.

DE 199 36 540 A1 discloses a similar stabilizer arrangement in which the stabilizer halves and an actuator are connected to one another by means of coupling elements. The end section of the stabilizer half is plugged into the coupling element and connected in a materially joined fashion thereto with a soldered connection. The other end of the coupling element is equipped with an internal toothing or external toothing, wherein the connecting part of the actuator has the toothing which corresponds thereto.

In all the abovementioned cases, although there is a rotationally fixed connection which can withstand rotationally acting forces, axial loading has to be compensated solely by pressure or the materially joined connection of the toothed sections in one another.

In the first case—of such a, what is referred to as overdimensioned connection—individual components are plugged one into the other, wherein the external dimension of the inner component is slightly larger than the internal dimension of the outer component. The components are pressed one into the other and loaded compressively. This leads to strong local loading of the components over a surface, which loading has a negative effect on their service life.

In the case of a materially joined connection, for example welding or soldering, heat is input into the material. In general, the stabilizer material is previously subjected to thermal treatment in order to improve the service life. Repeat inputting of heat reduces again the hardening of the material which has been achieved in this way. It is therefore advantageous if additional inputting of heat can be dispensed with.

The object of the present invention is therefore to make available a stabilizer arrangement for a motor vehicle in which the connection between the stabilizer half and the actuator with respect to axial forces is secured in an easy fashion and the individual components are not additionally loaded.

This object is achieved by means of a stabilizer arrangement as claimed in claim 1. Further advantageous refinements of the invention are the subject matter of the dependent claims.

A stabilizer arrangement according to the invention for a motor vehicle is composed of a first stabilizer half, a second stabilizer half, and an active or semi-active actuator which couples the two stabilizer halves. The actuator has a first connecting section which is connected in a rotationally fixed fashion to the first stabilizer half, and a second connecting section which is connected to the second stabilizer half in a rotationally fixed fashion. Furthermore, the connections are embodied so as to be axially nondisplaceable by virtue of the fact that the stabilizer halves are connected via their end sides to the connecting sections via a connecting element, wherein the connecting element is formed by a pin, a bolt or a screw or the like. A connecting element which is configured in this way is preferably guided through an opening in the wall of the connecting section of the actuator. The end side is to be understood as being the surface of the stabilizer half which is perpendicular to the lateral surface of the stabilizer half at the end of the straight section of the stabilizer half. In addition, this arrangement of the connecting element makes it possible to achieve a highly space-saving configuration of the entire stabilizer arrangement.

The connection according to the invention ensures that although the stabilizer halves are connected to the connecting sections in a positively locking fashion, the actuator-side ends of the stabilizer halves are not subjected to unnecessary compressive loading on their lateral surface and material weakening which results therefrom.

The rotationally fixed connection is preferably embodied as a splined coupling. In this context, the end of the stabilizer has an external toothing, and the connecting piece of the actuator has an internal toothing. The respective teeth engage in one another in a positively locking fashion, with the result that here complete frictional engagement is brought about. Advantageously no further processing is necessary to produce a rotationally fixed connection. Likewise, there is no need for additional bonding agent or even for thermal joining by means of welding or soldering.

Furthermore, the end side of the stabilizer half preferably has an elongate recess which corresponds to the opening in the wall of the connecting section of the actuator. The connecting element is guided through the opening in the recess on the actuator side and in this way connects the two components. At the same time, the connecting element can also take on sealing properties and protect the interior of the actuator against soiling and moisture. A further advantage of configuring the connecting element in this way is that the connection can, if appropriate, be made releasable here so that it is easily possible to replace defective components.

If the connecting element is a screw, the elongate recess of the stabilizer half has an inner thread. The screw has a collar which is larger than the opening in the wall of the connecting section. During screwing, the connecting element is pressed with the collar against the stabilizer half. The axial securing means are therefore formed by said collar together with the thread.

A further embodiment of the connecting element is a bolt with a collar. The latter is pressed with a slight overdimension into the elongate recess. In contrast to the pressed connections which are mentioned further above as disadvantageous, the stabilizer, in particular a surface thereof which is heavily loaded during use, is not destabilized but instead just a small section of the core region of the stabilizer, which suffers only slight loading during rotation or bending, is destabilized. Furthermore, the collar of the bolt additionally promotes the axial strength of the connection.

Of course, it is possible to use, in addition to the above-mentioned elements of the pin, bolt and screw, a bonding agent or a materially joined connection in order to facilitate the orientation of the components with one another. A bonding agent or materially joined connection then has an exclusively supporting function. They secure the individual components in the correct position with respect to one another until, for example, a bolt has been guided through the opening in the wall of the connecting element into the elongate recess in the stabilizer.

Furthermore, it has proven advantageous to form a stop at the end of the splined coupling which faces away from the actuator. The connecting element can be supported on this stop, and it is ensured that during assembly the stabilizer half is positioned precisely at its provided position in the associated receptacle in the connecting section.

In one particularly advantageous refinement of the invention, the actuator and at least one of its connecting sections is composed of one piece. This provides advantages in terms of assembly since fewer individual components have to be joined together. The avoidance of connecting points also leads advantageously to a greater stability of the overall component.

Nevertheless, it also provides advantages if at least one of the connecting sections is embodied as a separate component. In such a refinement of the invention, the opening of the connecting section is more easily accessible from the inside for the introduction of the connecting part. Furthermore, for a particular design of the actuator it may be necessary to manufacture the connecting sections and the rest of the actuator from different materials.

Further objectives, advantages, features and application possibilities of the present invention emerge from the following description of a plurality of exemplary embodiments with reference to the drawings. Here, all the described features and/or all the features which are illustrated form, in themselves or in any desired appropriate combination, the subject matter of the present invention, even independently of their combination in the claims or their back-reference.

IN THE DRAWINGS

Figure 2:
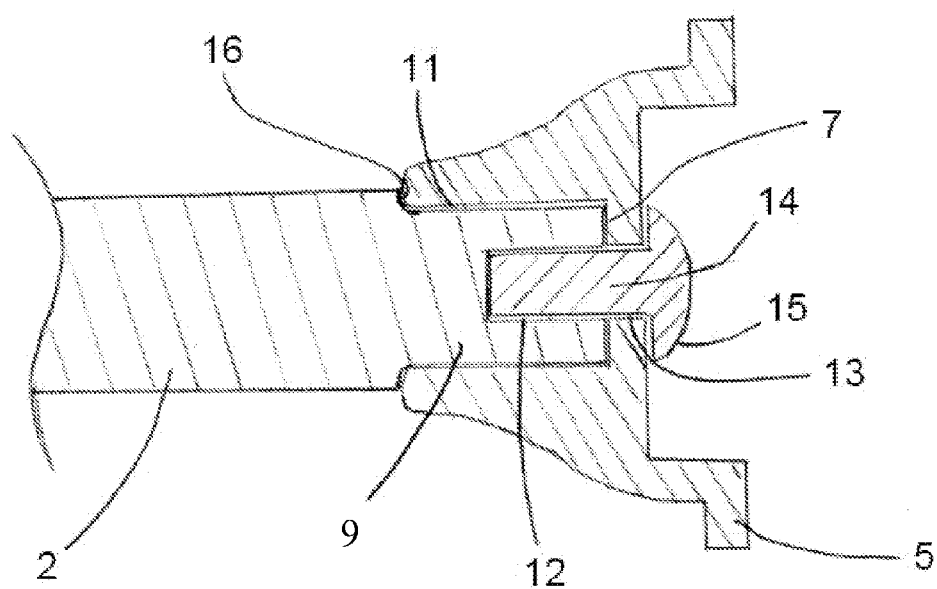
Figure 3:
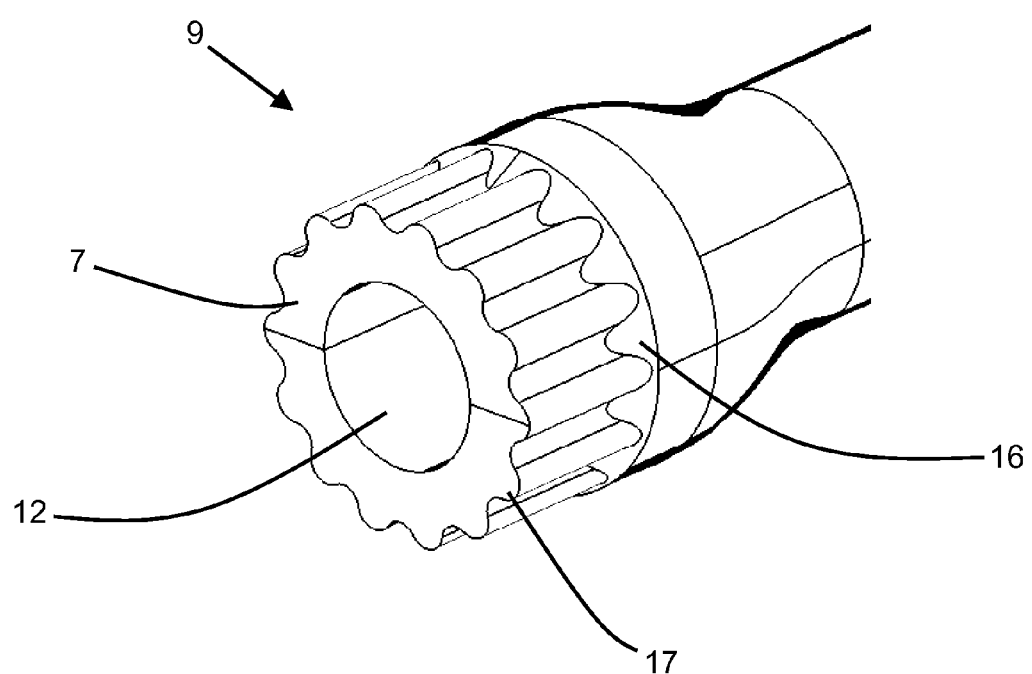

FIG. 1: shows a view of the stabilizer arrangement, wherein the individual components are not yet connected to one another, FIG. 2: shows a cross section through the connecting point between the stabilizer half and the connecting section, and FIG. 3: shows a view of the splined coupling of the end of the stabilizer half.

A stabilizer arrangement 1 according to the invention is shown in FIG. 1. Said stabilizer arrangement is composed of a first stabilizer half 2, of a second stabilizer half 3, and of an actuator 4. This actuator 4 can be configured actively or even semi-actively and connects the two stabilizer halves 2, 3 to one another.

In FIG. 1, this actuator 4 is arranged centrally. However, this is not necessarily provided in this way. It may, for example, prove advantageous, for reasons of use of the installation space, to attach the actuator 4 offset from the center. The designation stabilizer half is then not be understood as meaning that the two parts constitute precisely one half of the entire stabilizer but rather than the two parts are added together, together with the actuator 4, to form one complete stabilizer.

The actuator has at its ends a first connecting section 5 and a second connecting section 6. These connecting sections 5, 6 serve to position the corresponding stabilizer halves 2, 3 on the actuator. The connecting sections 5, 6 have receptacles for this (see receptacle 11 in FIG. 2), into which the stabilizer ends 9, 10 are pushed. The ends 9, 10 of the stabilizer halves are equipped with an external toothing, whereas the receptacles were equipped with an internal toothing which fits the latter. The toothings form a positively locking connection which ensures a rotationally fixed connection.

A press fit is not formed in the region of the splined coupling, as a result of which a stabilizer half 2, 3 and a connecting section 5, 6 continue to be movable relative to one another. In order to achieve axial immobility, a connecting element is used which connects the two individual parts to one another.

Such a connection is illustrated in FIG. 2. In this example, the first stabilizer half 2 is represented together with the first connecting section 5. Of course, the illustration also applies analogously to the second stabilizer half 3 and to the second connecting section 6. In this case, the connecting section 5 is not an integral component of the actuator and is attached to the actuator after the mounting of the stabilizer half 2 (corresponding devices are not illustrated).

The end 9 of the first stabilizer half is pushed into the receptacle 11 of the connecting section 5. On its end side 7, the stabilizer half 2 has an elongate recess 12. As soon as the end 9 of the stabilizer half 2 is fitted completely in the receptacle 11, the elongate recess 12 and an opening 13 in the wall of the connecting section 5 are located congruently one on top of the other. Both have the same diameter.

A connecting element 14, which is embodied here in the form of a bolt with a collar 15, is inserted through the opening 13 into the elongate recess 12. The diameter of the connecting element 14 is slightly larger than the diameter of the elongate recess 12 and of the opening 13, with the result that a slightly overdimensioned fit is produced. The collar 15 has a larger diameter than the opening 13, with the result that the connecting section 5 is pressed with the collar 15 against the stabilizer half 2.

The external toothing opens on its side facing away from the actuator 4 into a stop 16. The connecting section 5 presses against this stop 16, which therefore serves as a counterbearing and promotes the axial strength of the connection.

As a result of the shape of the connecting element 14 fitting precisely in the elongate recess 12 and the opening 13, the penetration of moisture and dirt in the interior of the actuator is also prevented.

As in the case of a smooth bolt, such a connection can be implemented by a screw connection. In this case, the elongate recess 12 has an inner thread into which a screw is turned through the opening 13.

Of course, within the scope of the invention it is also possible to use other types of connecting elements. The embodiment is expressly not restricted to screws, bolts and the like. The connecting elements can be composed, for example, of metal or plastic.

A somewhat more detailed view of the end 9 of the first stabilizer half 2 is supplied by FIG. 3. The elongate recess 12 for receiving the connecting element is located in the end side 7. The teeth of the external toothing 17 and the stop 16 are formed on the outside of the stabilizer half.

Tubes as well as solid rods are suitable for producing a stabilizer half 2, 3 according to the invention. In this context, the tubes or solid rods can have diameters and cross sections which vary over their length and which are matched to the loads which occur during travel and which differ locally. The tubes or solid rods are either firstly bent into the desired shape and then the ends processed, or vice versa. The necessary steps for this depend on the material used.

If tubes are used, the ends of the stabilizer halves are firstly cold forged and/or widened in order to have sufficient material available for the subsequent shaping of the external toothing. The cold forging and widening can take place here successively or even simultaneously. If appropriate, the elongate recess, which is produced from the interior in the case of a tube, is also equipped with an inner thread.

In contrast, if there is a stabilizer made of solid material, the elongate recess must be generated with or without an inner thread.

After the shaping of the external toothing, the ends are fed to mechanical final processing, which can comprise facing, milling, applying a weld preparation and other methods.

In order to improve the material properties, the stabilizer halves are subjected to further steps such as thermal treatment or shot peening, or both.

Furthermore, coatings and/or surface coats can be applied to the stabilizer halves to provide protection against corrosion.

List of Reference Numbers
1 Stabilizer arrangement
2 First stabilizer half
3 Second stabilizer half
4 Actuator
5 First connecting section
6 Second connecting section
7 End side of 2
8 End side of 3
9 End of 2
10 End of 3
11 Receptacle
12 Elongate recess
13 Opening
14 Connecting element
15 Collar of 14
16 Stop
17 Splined coupling

The invention claimed is:

1. A stabilizer arrangement for a motor vehicle, comprising:
a first stabilizer half with a first end side and a first recess in the first end side, wherein the first recess is positioned along a first axis of the first stabilizer half;
a second stabilizer half with a first end side and a first recess in the first end side, wherein the first recess of the second stabilizer half is positioned along a first axis of the second stabilizer half;
an actuator which couples the two stabilizer halves, the actuator comprising:
a first connecting section of the actuator with a first opening, wherein the first connecting section receives the first end side of the first stabilizer half to form a first rotationally fixed connection, wherein the first opening of the first connecting section and the first recess of the first stabilizer half are positioned along the first axis of the first stabilizer half; and
a second connecting section of the actuator with a first opening, wherein the second connecting section receives the first end side of the second stabilizer half to form a second rotationally fixed connection, wherein the first opening of the second connecting section and the first recess of the second stabilizer half are positioned along the first axis of the second stabilizer half;
a first connecting element, wherein the first connecting element is received by the first recess in the first end side of the first stabilizer half and by the first connecting section to form an axially fixed connection, wherein the first connecting section is nondisplaceable in an axial direction; and
a second connecting element, wherein the second connecting element is received by the first recess in the first end side of the second stabilizer half and is positioned along the first axis of the second stabilizer half.

2. The stabilizer arrangement as claimed in claim 1, wherein at least one of the first and second rotationally fixed connections is embodied as a splined coupling.

3. The stabilizer arrangement as claimed in claim 1, wherein the axially fixed connection is additionally supported by a bonding agent.

4. The stabilizer arrangement as claimed in claim 1, wherein the axially fixed connection is additionally supported by a materially joined connection.

5. The stabilizer arrangement as claimed in claim 1, wherein the first end side of the first stabilizer half comprises a portion of a splined coupling and a stop.

6. The stabilizer arrangement as claimed in claim 5, wherein the stop defines a maximum overlap of the actuator and the first stabilizer half.

7. The stabilizer arrangement as claimed in claim 1, wherein at least one of the first and second connecting sections is an integral component of the actuator.

8. The stabilizer arrangement as claimed in claim 1, wherein at least one of the first and second connecting sections is a separate component which is connected to the actuator.

9. The stabilizer arrangement as claimed in claim 1, wherein the first connecting element is embodied as a pin connection, bolt connection, or screw connection.

10. The stabilizer arrangement as claimed in claim 1, wherein the first connecting element is guided through the first opening of the first connecting section into the first recess of the first stabilizer half.

11. The stabilizer arrangement as claimed in claim 1, wherein the first connecting element is positioned along the first axis of the first stabilizer half.

12. The stabilizer arrangement as claimed in claim 1, wherein the first connecting element connects the first stabilizer half by the first end side to the first connecting section, and wherein the first connecting element is positioned within the first recess of the first stabilizer half and along the first axis of the first stabilizer half.

13. The stabilizer arrangement as claimed in claim 1, wherein the second connecting element interconnects the second stabilizer half to the second connecting section.

14. The stabilizer arrangement as claimed in claim 1, wherein a diameter of the first recess in the first end side of the first stabilizer half is the same as a diameter of the first opening in the first connecting section.

15. The stabilizer arrangement as claimed in claim 1, wherein the second connecting element is also received by the second connecting section of the actuator to form a second axially fixed connection, and wherein the second connecting section is nondisplaceable in an axial direction.

* * * * *